United States Patent [19]
Koether

[11] Patent Number: 5,875,430
[45] Date of Patent: Feb. 23, 1999

[54] SMART COMMERCIAL KITCHEN NETWORK

[75] Inventor: Bernard G. Koether, Tequesta, Fla.

[73] Assignee: Technology Licensing Corporation, Tequesta, Fla.

[21] Appl. No.: 643,207

[22] Filed: May 2, 1996

[51] Int. Cl.$^6$ .................................................. G05B 19/18
[52] U.S. Cl. ............................... 705/1; 364/131; 364/400
[58] Field of Search ......................... 364/468.15, 479.06, 364/479.11, 479.14, 474.16, 474.19, 131, 400; 395/215, 230, 234; 705/1, 15

[56] References Cited

U.S. PATENT DOCUMENTS

| | | | |
|---|---|---|---|
| 4,120,452 | 10/1978 | Kimura et al. | 235/381 |
| 4,390,953 | 6/1983 | Johnstone . | |
| 4,812,963 | 3/1989 | Albrecht et al. | 364/131 |

Primary Examiner—Gail O. Hayes
Assistant Examiner—Raquel Alvarez
Attorney, Agent, or Firm—J. De La Rosa

[57] ABSTRACT

The present invention provides a bi-directional communication network which provides real-time computer-aided diagnostics, asset history, accounting records, maintenance records and energy management. Advantageously, such a network integrates the various work aspects of today's food service industry to insure the proper work allocation of administrative and repair tasks. The system includes a control center, a communication link to a point of sale system, a plurality of kitchen base stations, and a plurality of kitchen or cooking appliances located within a site or cell. Maintenance and repair, once initialized, are monitored through the control center having a database with the necessary software diagnostics, accounting records, inventory records, and maintenance records for the particular appliance under service so as to integrate the various aspects of accounting, billing, repair and energy management.

86 Claims, 9 Drawing Sheets

SMART COMMERCIAL KITCHEN NETWORK

CROSS-REFERENCE TO RELATED APPLICATION

The present application is related to commonly assigned U.S. Pat. No. 4,812,963 entitled "Plural Cooking Computer Communication System," which is incorporated herein by reference.

TECHNICAL FIELD

The present invention relates to a communication network and, more particularly, to a communication network, such as a cooking computer communication system, for monitoring and controlling the activities of commercial kitchen or restaurant appliances, and for providing bi-directional communication between such appliances and a control center. Such kitchen or restaurant appliances, for example, includes deep vat fryers and various types of ovens, and cooling systems, such as refrigerators and HVAC systems, as well as other related food processing systems found in today's restaurants and fast food chains.

BACKGROUND OF THE INVENTION

In recent years, as cooking and restaurant appliances in large hotels or institutional kitchens have become more complex, there has been an increased need for the utilization of computers for diagnosing malfunctions. Today, cooking appliances are maintained and serviced, however, by a food service industry that—with exceptions—is too poorly equipped and untrained to do so. The domestic food service industry is composed of some three hundred independent service agencies, ranging in size from one up to hundreds of employees. Most, however, consist of just a few employees which are unfortunately burden with the responsibilities of invoices, repairs, inventories, warranties, credits, returns, and the like. For example, these service agencies not only have to generate invoices, but also have to collect payment, which for obvious reasons is time consuming. With such other duties, service agencies have the least amount of time to keep up with the technology of today's complex kitchen or cooking appliances. With the existing food service industry so fragmented and ill-suited to handle the latter administrative tasks as well as the repairs, it is estimated that their efficiency may be as low as 20%. In other words, although the food service industry has become the focal point of the work allocation, the service sector is the least capable segment of the industry to do so.

Accordingly, there is a need in the art to provide a cost-effective system which enhances the work force utilization of today's food service industry, allowing the proper work allocation of administrative and repair skills among those best suited to perform the tasks.

SUMMARY OF THE INVENTION

The present invention provides a bi-directional communication network which provides real-time computer-aided diagnostics, asset history, accounting records, maintenance records and energy management. Advantageously, such a network integrates the various work aspects of today's food service industry to insure the proper work allocation of administrative and repair tasks.

The system includes a control center linked to a point of sale (POS) or automated teller machine (ATM) system, a plurality of kitchen base stations, and a plurality of kitchen or restaurant appliances located within a site or cell(s). Maintenance and repair, once initialized, are monitored, for example, through the control center having a database with the necessary software diagnostics, accounting records, inventory records, and maintenance records for the particular appliance under service so as to integrate the various aspects of accounting, billing, repair and energy management.

In a preferred embodiment, each cell is allocated at least one communication channel, preferably wireless, to effect bidirectional communication with the base stations, which in turns are interconnected to the control center over high speed data links. In particular, the system monitors and tracks the maintenance and repair of kitchen appliances by means of information transmitted to and received from those appliances over the data network. Such information may include cooking parameters, billing information, appliance identification, diagnostic information, and maintenance instructions, among others. Direct billing is facilitated by transferring financial information among POS or ATM systems operated by various merchants and clearing house network centers.

Each kitchen base station may interrogate the appliance or the appliance may request to transmit diagnostic information relating to the operating conditions thereof, which diagnostic information may be immediately communicated to the control center. The control center may take action as appropriate, including, among others, downloading updated, operating and/or diagnostic software to the appliance, dispatching a service vehicle, or updating accounting and inventory information. Most of the functions are automatically controlled by the control center, but may be also performed manually by a control center operator. Alternatively, some of these functions may be distributed to the base stations, such, as in a distributed architecture network.

In the preferred embodiment, on site repair is enhanced through the use of a portable hand held terminal linked to the appliance through, for example, a wireless RS-232 interface, such as by infrared communication. The hand held terminal interrogates the appliance to diagnose abnormal operating conditions. Upon effecting repair, the control center preferably prepares and transmits an appropriate invoice and effects billing through the POS or ATM system. During repairs, should the hand held terminal require updated diagnostic software for the particular appliance under service, such a request is transmitted to the control center. The appropriate software is then transmitted to the terminal through the communication data network. In this manner, as new diagnostic tools become available for specific kitchen or restaurant appliances, they are readily accessible for use by the food service industry.

Similarly, the database contains maintenance instructions for each type of kitchen or restaurant appliance. If the service personnel is unfamiliar with the appliance, a request may be initialized for the control center to download the necessary repair and maintenance instructions for the appliance under service.

Importantly, the control center includes a database containing customer information, accounting history, appliance data, such as previous repairs and faults, updated diagnostic software and billing data. Advantageously, this allows service personnel as well as control center operators to update credits, warranties, or returns for a particular subscriber in real time. Also, service personnel may request the control center to generate and transmit various accounting, billing or repair records for a specific subscriber or appliance. Such capabilities enhance quality control as well as minimize the amount of work performed by service personnel on administrative tasks.

The control center may, if desired, control in real-time the normal operation for some or all of the kitchen or restaurant appliances. For example, to effect a change in a recipe for a particular food product, new cooking parameters may be communicated to the controllers of each desired kitchen or restaurant appliance. In this manner, retail food service chains may readily update the cooking profiles of their food products on a global basis.

In another aspect of the invention, the control center may control when the kitchen or restaurant appliances are turned on and off. In this manner, a minimum peak power can be achieved by limiting the number of appliances turned on at any instance in time. Moreover, the appliances can be prioritized so that desired appliances can be serviced first, depending on the type of appliance and its relative importance to the location.

BRIEF DESCRIPTION OF THE DRAWINGS

The features and advantages of the present invention will become more readily apparent from the following detailed description of the invention in which like elements are labeled similarly and in which.

DETAILED DESCRIPTION

The inventive Smart Commercial Kitchen (SCK) network has the ability, among other things, in real-time to monitor and control the maintenance, repair and energy management of kitchen or restaurant appliances located over a wide geographical area. Maintenance and repair, once initialized, are monitored through a control center which contains the necessary software diagnostics, accounting records, inventory records, and maintenance records for the particular appliance under service. The capability to integrate these various accounting and repair services affords a highly efficient means for providing timely service to system subscribers. The SCK network may be customized to the particular needs of the subscribers, and due to the preferred use of wireless communication, such as cellular radio communication, may be installed and used virtually anywhere in the world.

It is contemplated that the present SCK network may be realized, in part, by wireless communication. It is to be understood, however, that the network described below is for the purpose of illustration only and not for the purpose of limitation. Other suitable communication, whether optical or wired, may be used with the present invention.

Also, in the embodiment below, integrated repair and accounting services are provided and coordinated preferably through a centralized control center. It should, however, be clearly understood that some of these services may be distributed or off loaded to base stations which may be programmed to effect these latter services. The choice is dependent on whether the network is structured as a highly centralized or distributed architecture.

Figure 1:
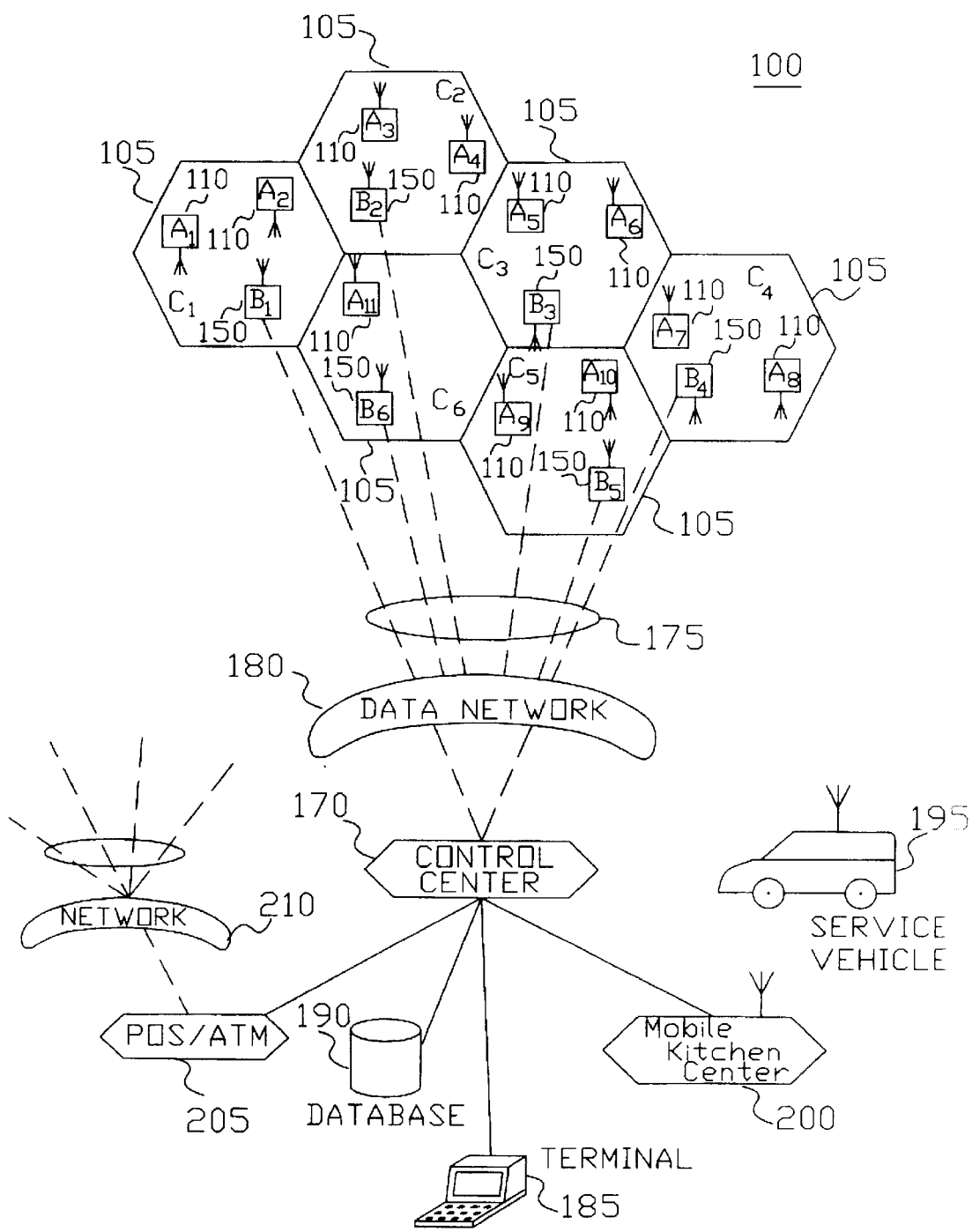
FIG. 1 is a pictorial representation of the present smart commercial kitchen network including a control center, a plurality of kitchen base stations, and a plurality of kitchen or restaurant appliances.

Referring to FIG. 1, there is shown—in schematic block diagram—a communication system 100 in accordance with the principles of the invention. In FIG. 1, an arbitrary geographic area may be divided into a plurality of radio coverage areas or cells 105 ($C_1$–$C_6$). It should be clearly understood that these cells may be located within the same or different buildings. While the system in FIG. 1 is shown to include only six (6) cells, it should be clearly understood that the number of cells may be much larger.

Figure 2:
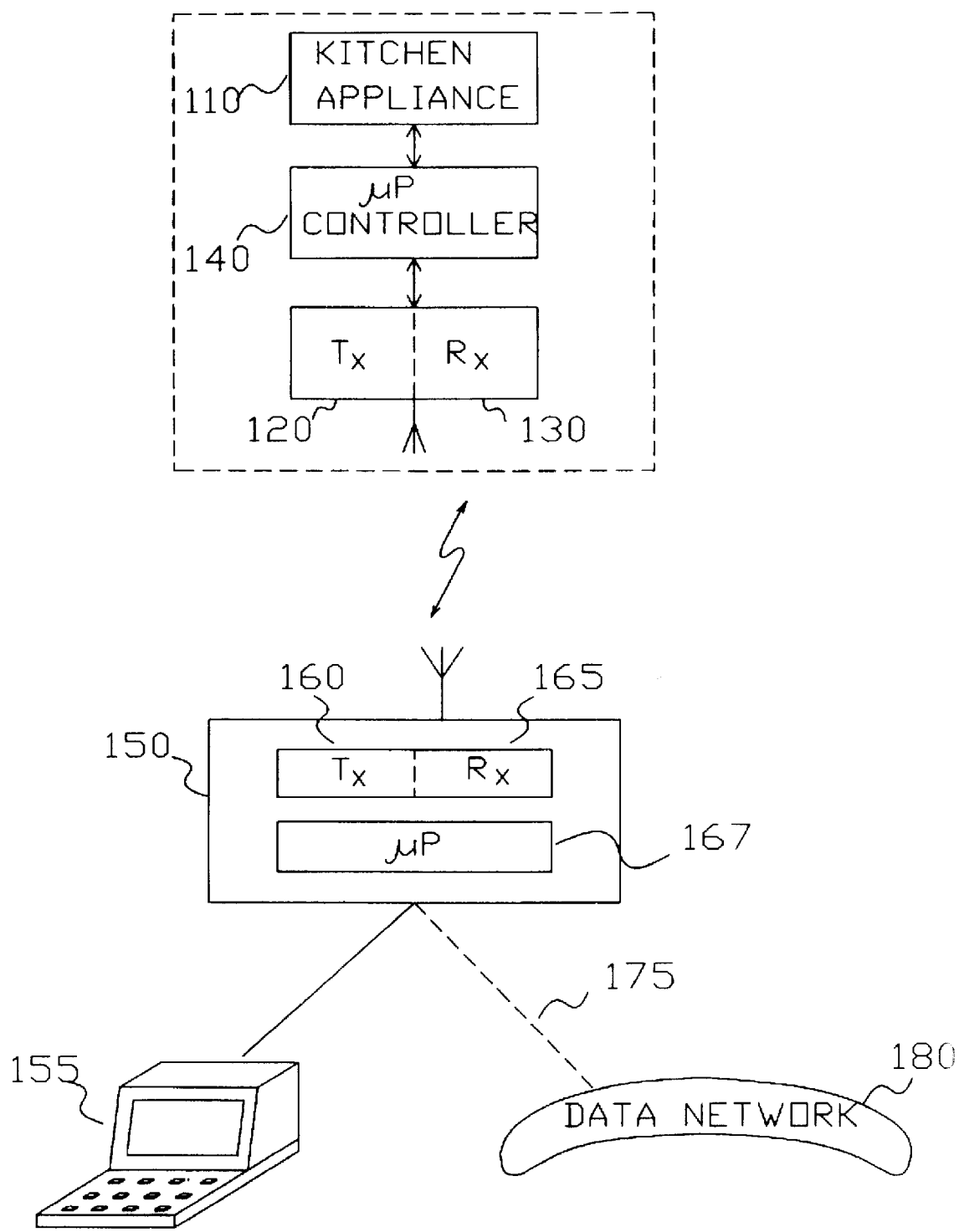
FIG. 2 is a more detailed block diagram of the appliances and the kitchen base stations of FIG. 1.

Associated with and located within each of cells 105 ($C_1$–$C_6$) is one or more kitchen or restaurant appliances 110 ($A_1$–$A_{11}$) under subscription to the services of the system. Each kitchen appliance 110 ($A_1$–$A_{11}$) is preferably provided with a RF transmitter 120, RF receiver 130 and microprocessor based controller 140, as illustrated in FIG. 2. Alternatively, each kitchen appliance may effect communications through wire data links. Restaurants, bakeries or hotels, for example, can have anywhere from one to forty (40) kitchen appliances at a single site or cell. Such kitchen or restaurant appliances include, for example, deep fryers, refractory ovens, baking ovens, combination ovens, infrared ovens, rotisseries, refrigerators, HVAC systems, and the like.

Microprocessor based controllers have been developed, for example, by Food Automation-Service Techniques, Inc. (FAST.)® of Connecticut in recent years to assist in the preparation of properly cooked foods. These controllers, sold under the trade name FASTRON®, among other things, regulate the temperature within the kitchen appliance to insure that the food is cooked or baked to the proper degree of doneness. More particularly, under program control, the controller regulates the various operations of the kitchen appliance, such as the cooking time and temperature, for either a single food product or a plurality of food products. That is, the kitchen appliance is programmed to operate with cooking parameters tailored for a specific food product. See, for example, U.S. Pat. No. 4,920,948, which is incorporated herein by reference.

Moreover, the controller regulates the percentage of time power is applied to the heating (or cooling) element in accordance with the cooking parameters selected by the user. For example, the heating element or heating elements may be pulsed with either a fixed or variable duty cycle (proportional control heating), may be fully turned on, or operated in an off/on manner similar to a thermostat, depending on the heating mode of the kitchen appliance.

Moreover, such controllers may include built-in intelligent sensing and diagnostic equipment, which coupled through an interface board, detect and identify various types of failures. Such failures include faulty heaters, sensors, fans, and the like. See, for example, U.S. Pat. No. 5,043,860 and applicants' copending applications: U.S. Ser. No. 08/501,211 and U.S. application entitled "Diagnostic System For A Cooking Appliance" filed Oct. 26, 1995, Ser. No.

08/549,098, which all are commonly assigned and incorporated herein by reference.

With continuing reference to FIG. 1, kitchen base stations 150 ($B_1$–$B_6$) may be found within respective cells 105 ($C_1$–$C_6$). Preferably, each kitchen base station 150 ($B_1$–$B_6$) is capable of communicating through wireless means, such as through cellular radio or other wireless means, with corresponding kitchen appliances 110 ($A_1$–$A_{11}$). If desired, manual changes in the menus or the cooking profiles may be made through an appropriate terminal 155 attached to the base station. As such, each kitchen base station 150 ($B_1$–$B_6$) includes a RF transmitter 160 and RF receiver 165, as illustrated in FIG. 2. Wire interconnections are not desirable, due primarily to the likelihood of such wires being inadvertently cut by culinary instruments. It should, however, be understood that wire interconnections may be used. Of course, satellite, microwave or infrared communication may also be used in accordance with principles known to those skilled in the art.

Preferably, each of cells 105 ($C_1$–$C_6$) is allocated at least one cellular radio channel used to effect bidirectional communication so as to monitor and track the maintenance, repair and energy management of kitchen appliances 110 ($A_1$–$A_{11}$) by means of information transmitted to and received from those appliances. Such information may include cooking parameters, billing information, appliance identification, diagnostic information, and maintenance instructions, as discussed herein below. Those skilled in the art will readily note that the channels may operate either in an analog or a digital mode or a combination thereof. In the digital mode, analog signals are converted to digital representations prior to transmission over the RF channel. Purely data messages, such as those generated by microprocessor based controller 140 may be formatted and transmitted directly over a digital channel.

Communication is provided between kitchen base stations 150 ($B_1$–$B_6$) and a control center 170 through communication links 175 of a data network 180. Control center 170 may be attended by one or more trained operators through terminals 185. Digital links operating at 56 Kb/sec or higher may be used as communication links 175. The data network 180 may be an integrated system digital network (ISDN) facility. In this latter instance, the X0.25 protocol, may be used for facilitating the sending of message data between kitchen base stations 150 ($B_1$–$B_6$) and control center 170. The X0.25 protocol is well known to those of ordinary skill in the art and will not be discussed herein for the sake of clarity.

It should be understood that control center 170 includes a repair and accounting database 190 that permits the exchange of information relating to repair, accounting and billing. In addition, each kitchen base station 150 may contain internally resident databases necessary or useful in the customer billing or accounting process. Control center 170 may be, for example, located within the same physical location as the cells. For extended coverage around the world, however, a plurality of control centers linked to each other may be employed.

Each kitchen base station 150 ($B_1$–$B_6$) may interrogate a corresponding controller 140 or controller 140 may request to transmit diagnostic information relating to the operating conditions of kitchen appliances 110 ($A_1$–$A_{11}$), which diagnostic information may be immediately communicated to control center 170. It is contemplated that this diagnostic information may also be stored in internally resident databases of the kitchen base stations. Control center 170 may take action as appropriate, including, among other things, downloading updated diagnostic software to controller 140, dispatching a service vehicle 195 through a mobile kitchen center 200, or updating accounting and inventory information, which is discussed in more detail herein below. Most of the functions are automatically controlled by control center 170, but may be also performed manually by the control center operator. If desired, some of these functions may be distributed to the base stations.

Service vehicle 195 is provided, maintained and operated independently by the service agency subscribers to the system. Although FIG. 1 only shows one service vehicle, it should be clearly understood that in practice a fleet of service vehicles would be used.

Communication network 100 also is preferably linked to a generic point of sale (POS) or an automated teller machine (ATM) system 205 which is linked to each of kitchen base stations 150 through data communication network 180. Further ATM/POS system 205 includes a POS/ATM data communication network 210. Plurality of independently operated ATM/POS systems all intercommunicate simultaneously in order to provide billing service to subscribers of the inventive communication network. A clearing house data communication network also interconnects the plurality of ATM/POS systems to clearing house network centers. By transferring information among the different ATM/POS systems operated by various merchants, the clearing housing data communication network and the clearing house network centers allow direct inter-institution transactions, such as between ATM/POS system 205 and the particular ATM/POS system operated by the subscriber's financial institution.

Figure 3:
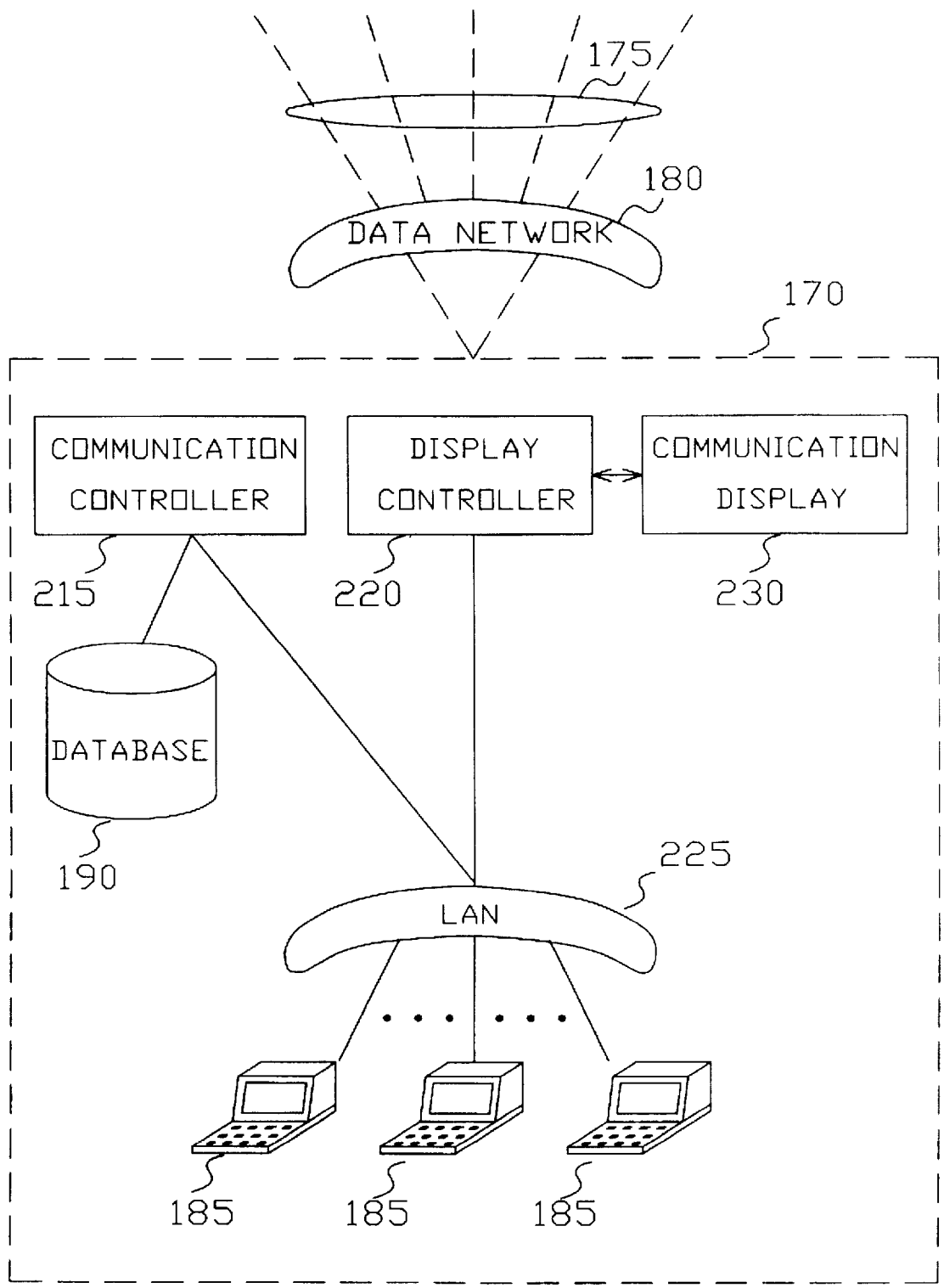
FIG. 3 is a more detailed block diagram of the control center of FIG. 1.

Referring to the illustration of FIG. 3, control center 170 may include a communication controller 215, and a display controller 220, there being a suitable conventional interface 225 therebetween. As stated above, control center 170 includes database 190 containing, for example, the locations of the kitchen appliances, diagnostic software, associated accounting and billing information, and energy management data, as discussed herein below. Interface 225 may be a local area network (LAN) interface, having one or more terminals 185, allowing control center operators to enter information. Terminals 185 are understood to include any of a variety of input devices such as a keyboard, mouse, trackball, or other user interface.

Figure 4:
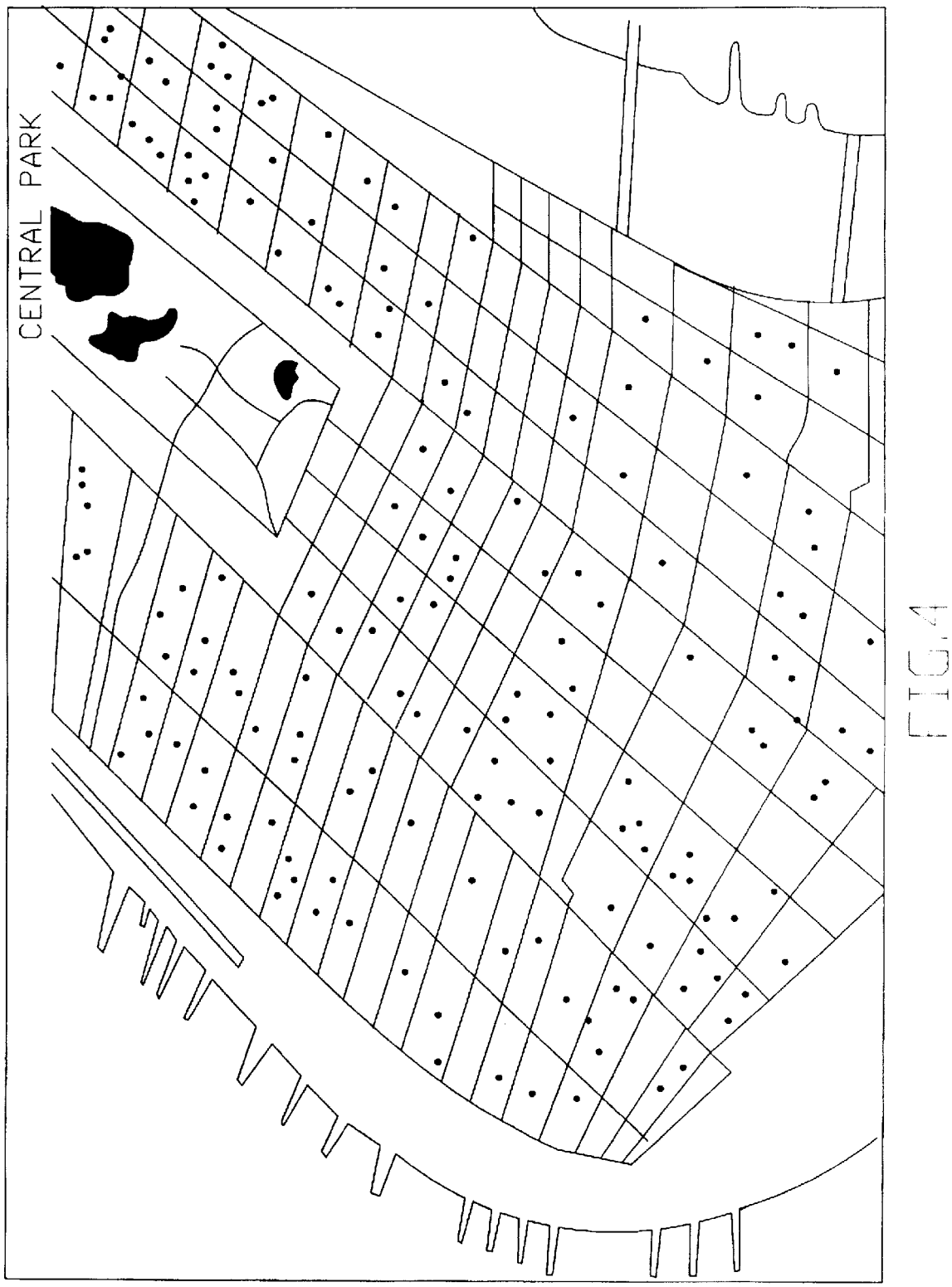
FIG. 4 is an exemplary illustration of a coverage map as it might be displayed to a control center operator.

Communication controller 215, among other things, serves as a processor and buffer between kitchen base stations 150, and display controller 220 and database 190. Data transmitted through communication controller 215 may be displayed on a communication display 230. Display controller 220 is provided with a map display which displays information regarding the kitchen appliances in a graphical manner, such as on pre-existing digitized maps of arbitrarily large geographical areas, such as a city or state. Such a coverage display is illustrated in FIG. 4. For example, appliances may be noted by dots, with those requiring service indicated in red. Other suitable legends may be displayed, for example, indicating the type of appliance, last service day, parts availability, among other things.

Figure 5:
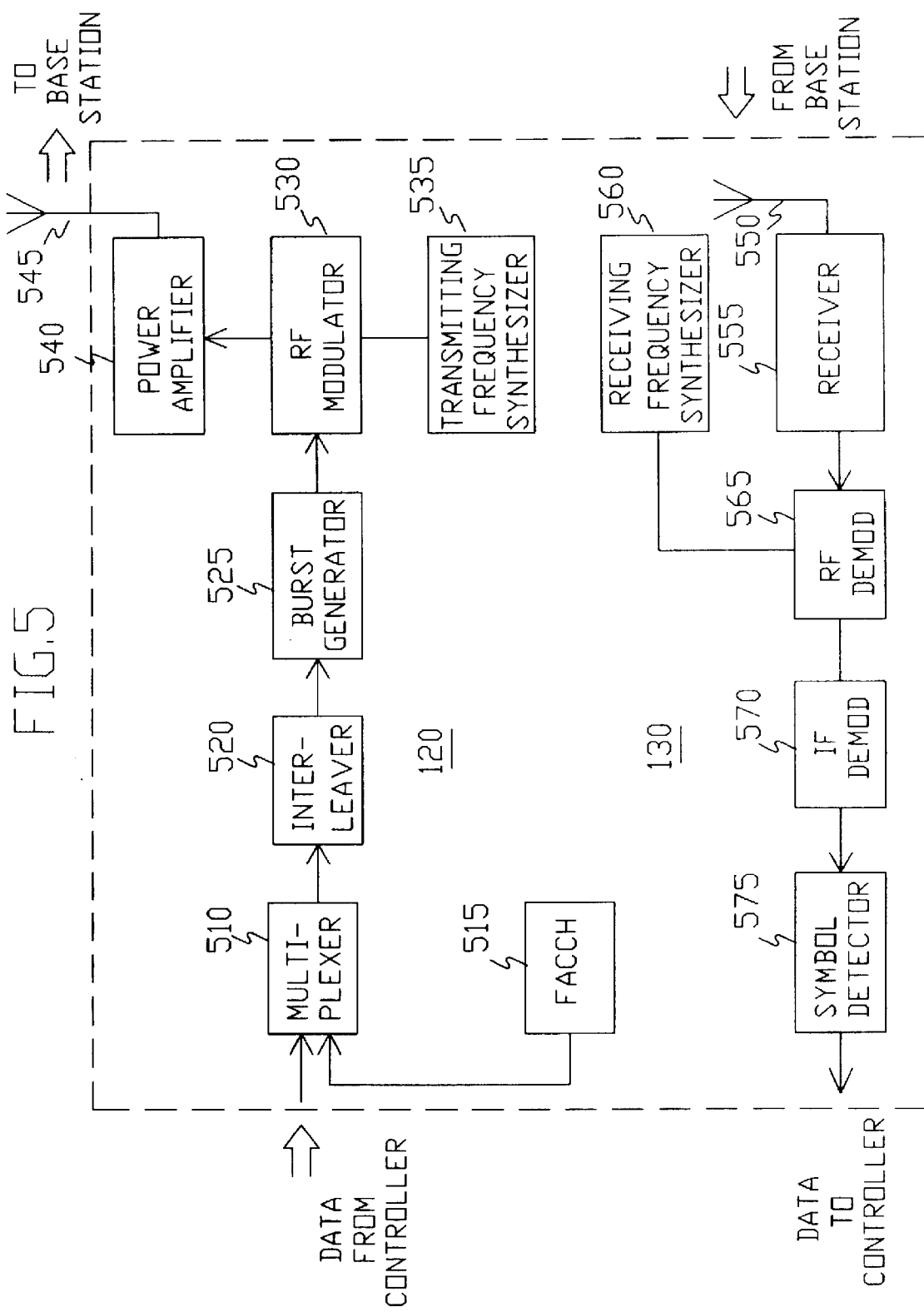
FIG. 5 is a block diagram of the transmitter and receiver of a kitchen or restaurant appliance used in accordance with the present invention.

Referring next to FIG. 5, there is shown therein a simplified schematic block diagram of the equipment for kitchen appliances 105 used to transmit and receive data from kitchen base stations 150 in accordance with the present invention. In particular, the equipment illustrated in FIG. 5, may be used for communication to kitchen base stations 150 over digital channels. Data destined for transmission to the kitchen base station is divided into data packets of messages in accordance, for example, with the time division multiple access (TDMA) technique of digital communications. Those skilled in the are will readily note that other techniques may be used, such as CDMA. Data packets along with supervisory messages generated by a so-called fast associated control channel (FACCH) generator 515 are time division multiplexed by multiplexer 510. The output of multiplexer 510 is provided as an input to a burst interleaver 520 that divides the data into n consecutive time slots, each occupied by a byte consisting of m bits of control information. This interleaved data forms the input to a burst generator 525 that produces "messages burst" of data, each consisting of a time slot identifier, digital verification code, control or supervisory information and the data to be transmitted.

The message burst produced by burst generator 525 is provided as an input to a RF modulator 530. RF modulator 530 is used for modulating a carrier frequency according to, for example, the $\pi/4$ DQPSK technique that is well known those in the art of cellular radio communication. The use of this technique implies that the information transmitted by each appliance transmitter is differentially encoded, that is two bit symbols are transmitted as four possible changes in phase: + or $-\pi/4$ and + or $-3\pi/4$. The carrier frequency for the selected transmitted channel is supplied to the RF modulator by a transmitting frequency synthesizer 535. The burst modulated carrier signal output of RF modulator 530 is amplified by a power amplifier 540 and then transmitted to the base station through an antenna 545.

Each appliance 110 receives burst modulated signals from kitchen base stations 150 through an antenna 550 connected to a receiver 555. A receiver carrier frequency for the selected receiving channel is generated by a receiving frequency synthesizer 560 and supplied to a RF demodulator 565. RF demodulator 565 is used to demodulate the received carrier signal into an intermediate frequency (IF) signal. The intermediate frequency signal is then demodulated further by an IF demodulator 570 which recovers the original digital information as it existed prior to $\pi/4$ DQPSK modulation. The digital information is then passed to symbol detector 575 which converts the two bit symbol format of the digital data provided to a single bit data stream. For a more detailed description on the use of cellular radio communication, see, for example, *Cellular Radio: Principles and Design*, Raymond C. V. Macario, McGrraw-Hill, Inc. 1993.

Those skilled in the art will readily note that much of the equipment used by appliances 110 to effect cellular communication may also be used by kitchen base stations 150 and mobile kitchen center 200. Accordingly, for the sake of simplicity, that equipment will not be discussed herein. There is, however, one important difference. Kitchen base stations 150, unlike appliances 110, are preferably connected to control center 170 through high speed communication links of data network 180. Also, kitchen base stations 150 each includes a microprocessor 167 that controls the activities of the base station and communication among the appliances and the kitchen base stations. Decisions are made by the microprocessor in accordance with data received from control center 170. The microprocessor is also provided with terminal keyboard and display unit 155 that allows a user to exchange information with appliances 110 as well as with control center 170.

Figure 6:
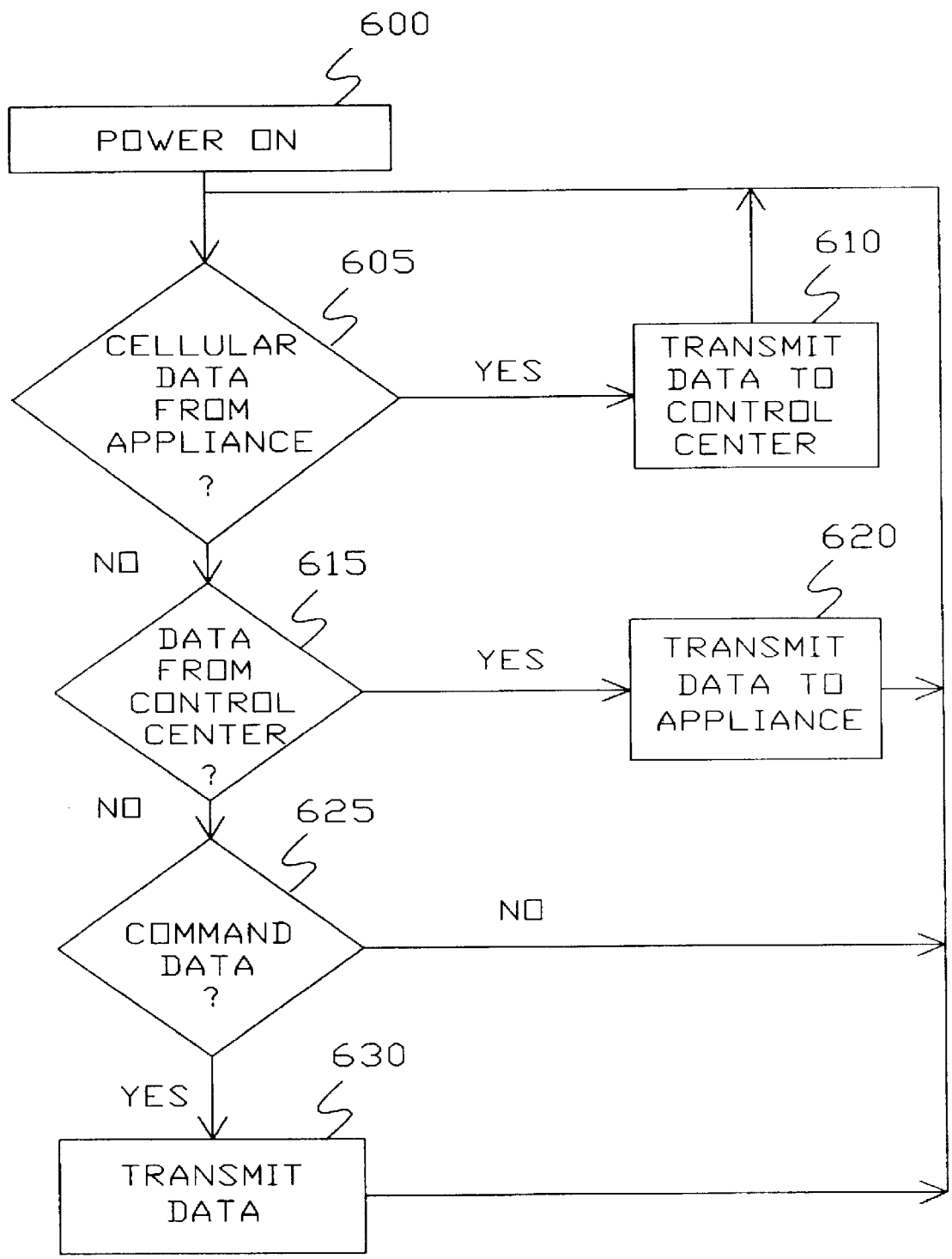
FIG. 6 is a flow chart illustrating the operation of the kitchen base station of FIG. 1.

FIG. 6 is a simplified flow chart illustrating the operation of the kitchen base station. Briefly, the flow chart includes a sequence of generally repetitive instructions arranged in a loop in which the station polls or is interrupted by special events and branches to an appropriate communication mode.

On power up at block 600, control passes to block 605 which determines whether data has been received from the kitchen appliances. Essentially decision block 605 determines whether the kitchen appliance(s) are communicating to the control center. If such communication is requested, control passes to block 610 to effect communication. Otherwise, block 615 determines whether the control center is attempting to communicate with the kitchen appliance(s). If so, at block 620 the received data is forwarded to the appropriate appliance. Control then passes to block 625 which determines if an operator has entered any message data, either to an appliance or the control center. Any such data is then transmitted at block 630.

In general, an application-oriented protocol is used to coordinate the activities between the appliances and the control center to ensure common syntax semantics for the transmitted application data. For example, the application-oriental protocol may specify a particular type of encoding for appliance identification data as well as the origination of such information with a message. The application-oriented protocol formats the messages and transmits either to the kitchen appliance or the control center. Control center 170 may transmit, for example, updated diagnostic software for the appliance, updated cooking profiles, and in general, data associated with the operations of the kitchen appliances. On the other hand, data transmitted from the kitchen appliance may include identified failures or malfunctions in the cooking appliance, including kitchen appliance identification information.

Normally, monitoring and tracking control passes to the control center after a malfunction or fault has been reported by the microprocessor based controller. However, the control center may effect preventive maintenance even when there is no malfunction reported. Scheduled preventive maintenances are stored in database 190. Alternatively, each base station may request preventive maintenance for its associated kitchen appliance(s). At the appropriate time, control center 170 dispatches a service vehicle.

Figure 7A:
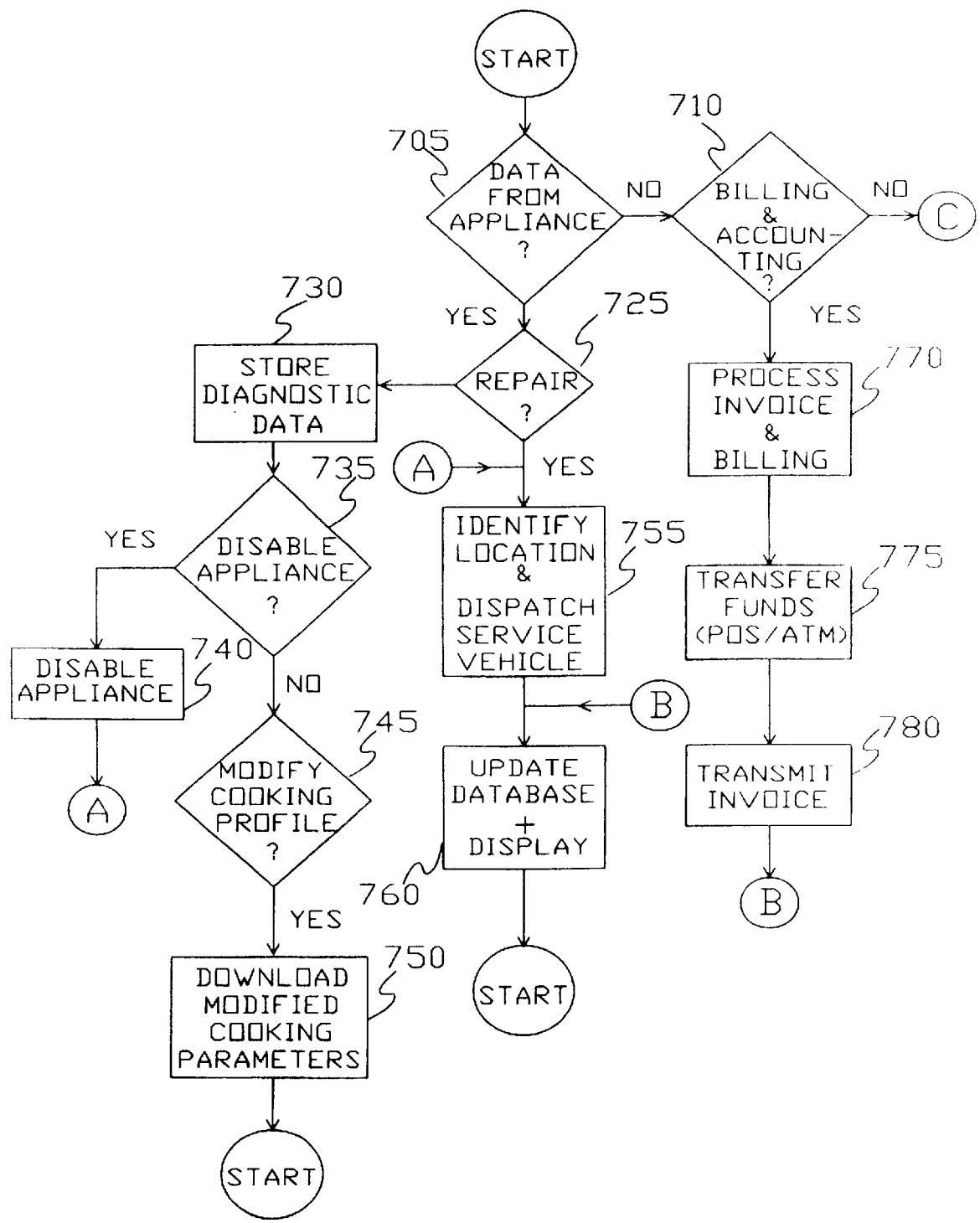
FIG. 7A and FIG. 7B is flow charts illustrating the operation of the control center of FIG. 1.
Figure 7B:
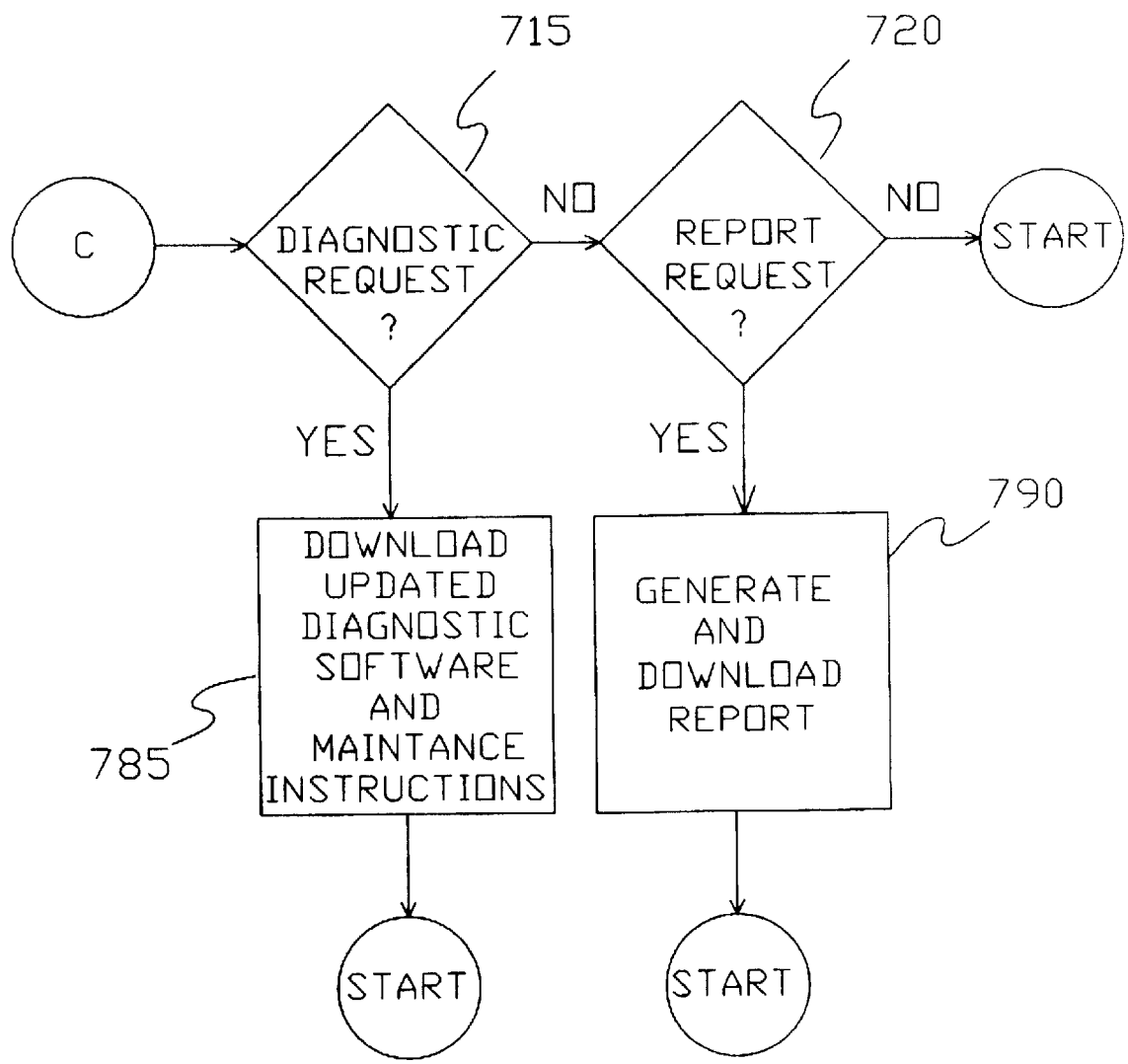

Referring now to FIGS. 7A–7B, the operation of the control center is illustrated. FIGS. 7A and 7B the manner in which the control center in the present embodiment tracks and monitors repair and maintenance. In most instances, it is understood that the control center initializes service only to effect repair or preventive maintenance. Integrated with this function is the system's capability to effect billing and accounting.

Normally, message data from the appliances consists of four different types: repair, billing, diagnostic or reports. At decision blocks 705, 710, 715 and 720, control center 170 determines which type of message data it is. Block 705 checks for repair message data. If, in decision block 725, a repair request has been received from the appliance, control then passes to block 755 which, once identifying the location of the appliance and the nearest service agency, dispatches a service vehicle.

Those skilled in the art will readily note that the network system of the present invention allows the control center to monitor kitchen appliances located over wide geographical areas for early warning of failure or degradation in performance. If the degradation, however, is gross, the control center may communicate and display on the console of the kitchen appliance a message warning that the kitchen appliance is unacceptable for cooking purposes. If desired, the control center may be programmed in the latter instance to disable the kitchen appliance to eliminate any possible health risks. Alternatively, the cooking parameters of the kitchen appliance may be changed to compensate for the malfunctioning appliance until repairs can be effected.

Once a service vehicle has been dispatched, any graphical display of the appliances as well as database 190 is updated to indicate the current status of the appliance under service, as noted at block 760.

It is contemplated that the control center responds to diagnostics information transmitted periodically by the appliance. At block 730, such diagnostic information is stored in database 190. This diagnostic information may include, but is not limited to the information indicated below:

Appliance Location
Appliance Type
Controller Type
Diagnostic Software Version
Last Repair Date
Next Maintenance Date
Time Stamp
Date Stamp
Type of Malfunction
   Heaters
   Fans
   Power supplies
   Sensors
   Electronics
   Software
Statistical Cooking Data
   Hours of Operation
   Deviations From Operating Temperature
   Deviations From Normal Operating Temperature
   Gradients
Cooking Profiles
   Time
   Temperature
   Fan setting
   Humidity setting
   Rotation Setting (for rotisserie)
   Belt Speed
   Damper Position
   Microwave Energy Setting
   Refrigeration Time and Temperature According to the preferred embodiment, control center 170 analyzes at block 735 such diagnostic information so as to determine whether to disable the appliance at block 740 or at block 745 to modify the cooking profiles stored in the appliance. Such analysis may use the techniques disclosed, for example, in U.S. Pat. No. 5,043,860, U.S. Ser. No. 08/501,211 and U.S. patent application entitled "Diagnostic System For A Cooking Appliance," (Ser. No. 08/549,098), filed Oct. 26, 1995. The generation of other such diagnostic-specific software may be realized by those programmers of ordinary skill in the art of cooking. For example, it is contemplated that such diagnostic software may use artificial intelligence or so-called "fuzzy-logic."

Such diagnostic information stored in database 190 may also be later retrieved and used for quality control to determine the frequency and type of failures for specific types of kitchen appliances.

By way of reiteration, based on information transmitted to control center 170, a repair person may be dispatched to the site of the kitchen appliance requiring service or preventive maintenance. This dispatch can be effected through radio communication (e.g., mobile kitchen station 200) or through the use of an ordinary telephone to the appropriate service center nearest to the location of the kitchen appliance.

Figure 8:
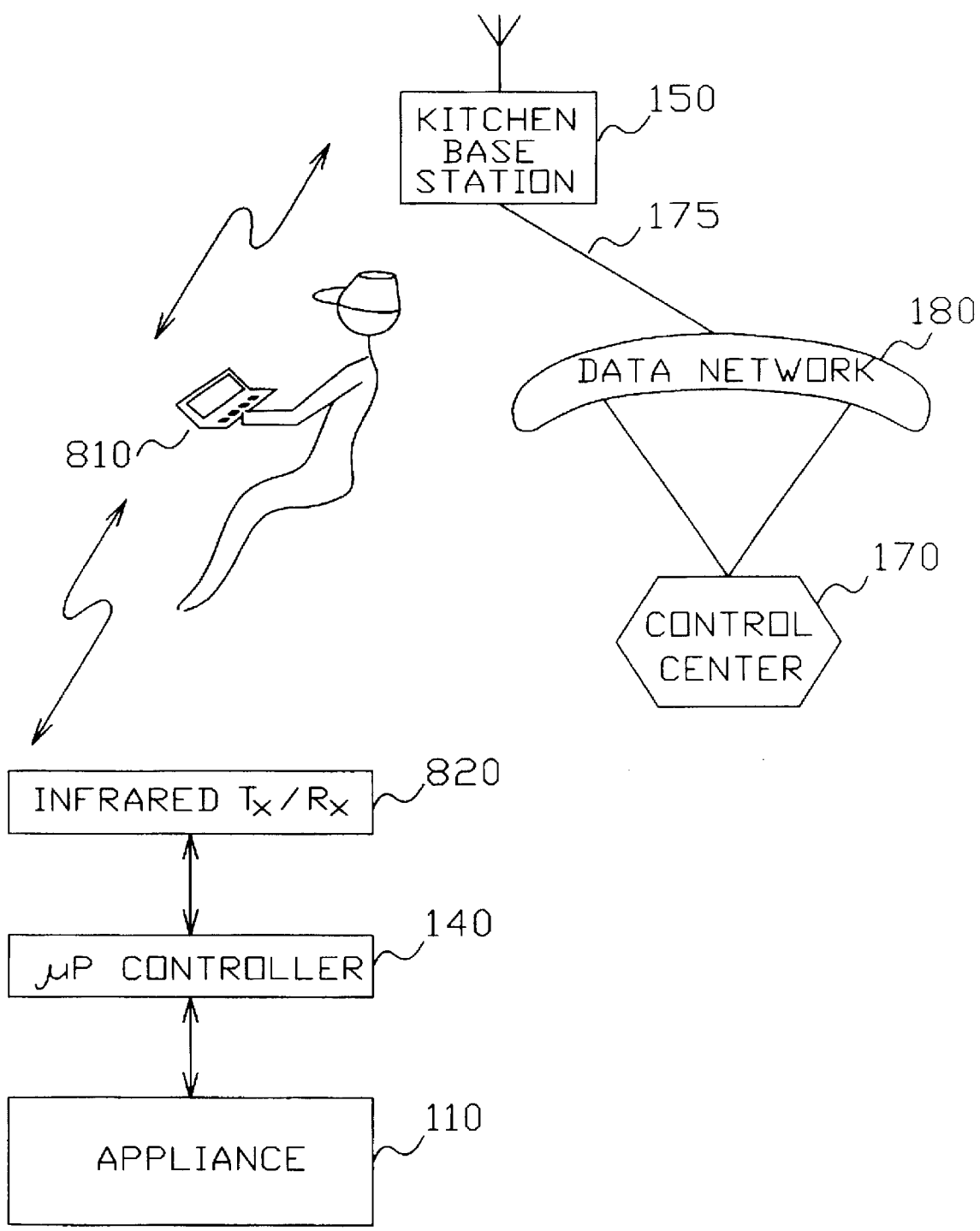
FIG. 8 is a pictorial representation of the repair process used in accordance with the present invention.

Referring to FIG. 8, on site repair is enhanced through the use of a portable hand held terminal 810 having, for example, a Palm/Laptop computer linked to microprocessor based controller 140 by a suitable interface, such as, for example, a wireless RS-232 interface using infrared communication. Of course, wireline or optical interfaces may also be used. Such hand held pocket computers are readily available from Texas Instruments, Hewlett Packard and Casio, among others. Hand held terminal 810 interrogates the controller so as to ascertain the model and model number of the appliance under service, and then diagnoses abnormal operating conditions. Of course, should infrared communication be used, controller 140 is equipped with an infrared transmitter/receiver 820. The low-level software is readily capable of implementation by those skilled in the art. For example, conventional database management software may be employed in the hand held terminal along with suitable diagnostic software. It is contemplated that such software and the like, for example, may be stored in standardized memory cards conforming to both the JEIDA and PCMIA standards. Both standards are substantially identical for use in 68 pin interchangeable memory cards.

Hand held terminal 810 also has a local RF receiver and transceiver provided with an antenna by which it communicates to control center 170 via kitchen base station 150. Cellular communication to the kitchen base station may be effected as discussed above herein. To preserve the data contents of the hand held terminal, a memory back-up battery is preferable.

Prior to effecting repairs, terminal 810, however, may request from control center 170 the associated accounting and service information associated with the appliance under service. This is illustrated in block 710 of the FIG. 7. Such accounting and service information includes, but is not limited to:

Customer Name
Customer Location
ID
Service Area
Account Number
Bank
Service Warranties
Credits Upon effecting repair, control center 170 prepares and transmits at block 770 an appropriate invoice. The subscriber or an authorized person thereof then enters a security password or code, such as a personal identification number (PIN) authorizing funds to be transferred from the subscriber's institution to the service agency that performed the repair or maintenance. Alternatively, an unauthorized signature may be digitalized and captured. Upon approval, control center 170 at block 775 initiates a transfer of funds from the customer's or subscriber's financial institution to the account of the service agency. Once completed, the invoice is transmitted at block 780 to terminal 810 which then prints a hard copy of the invoice.

Those skilled in the art will readily recognize the advantages of this integrated billing and accounting services inasmuch as this eliminates the need for any accounting back at the office of the service agency.

Alternatively, inasmuch as hand held terminal 810 contains the billing records for the appliance under service, the invoice may be prepared by hand held terminal 810. In this latter case, hand held terminal 810 is embedded in memory with the standard billing and invoicing format. Once prepared, the billing records may be transmitted to control center 170. In this manner, some of the accounting functions may be distributed or off loaded to the hand held terminals. of course, those skilled in the art will readily realize that kitchen base stations 150 may also be programmed to prepare the invoice. These latter choices are dependent on whether the network is structured as a highly centralized or distributed architecture.

Once repairs have been made, control center 170 then updates the accounting, billing and maintenance records within the database. Also, control center 170 may update inventory, taking into account any parts used in making the repairs. In this manner, service personnel may later readily ascertain the availability of parts for a particular appliance, such as through hand held terminal 810.

During repairs, should terminal 810 require updated diagnostic software for the particular appliance under service, such a request is transmitted to the control center. Such a request is responded to at block 715, with the appropriate software then transmitted to terminal 810 via the communication network, as indicated at block 785. In this manner, as new diagnostic tools become available for specific kitchen appliances, they are now readily accessible for use by the food service industry.

Similarly, database 190 may contain maintenance instructions for each type of kitchen appliance. If the service personnel is unfamiliar with the appliance, a request may be initialized for control center 170 to download the necessary repair and maintenance instructions for the appliance under service.

Importantly, control center 170 includes database 190 containing customer information, accounting history, appliance data, such as previous repairs and faults, updated diagnostic software and billing data. Advantageously, this allows service personnel as well as control center operators to update credits, warranties, or returns for a particular subscriber in real time. Also, service personnel may request at block 720 for center 170 to generate and transmit various records for a specific subscriber or appliance as indicated below;

Payment History

Maintenance History

Appliance Part Inventory

Customer Data

Prior Repairs or Malfunctions

Warranty Records

Such capabilities enhance quality control as well as minimize the amount of work performed by service personnel on administrative tasks. Database management software running under UNIX may be employed in control center 170, which is readily capable of implementation by those skilled in the art.

Also, it is contemplated that the control center may, if desired, control in real-time the normal operation for some or all of the kitchen appliances. For example, to effect a change in a recipe for a particular food product, new cooking parameters may be communicated to the controllers of each desired kitchen appliance. In this manner, retail food service chains, such as McDonald's® or Burger King®, may readily update the cooking profiles of their food products on a global basis.

Those skilled in the art will readily understand that during normal operation, the controller of each kitchen appliance regulates the percentage of time power is applied to the heating means in accordance with the stored cooking profiles of the food products. For example, the heating means may be pulsed with either a fixed or variable duty cycle, may be fully turned on, or operated in an on/off manner similar to a thermostat. The specific control algorithm is based on the particular type of kitchen appliance being controlled, for example, fryer, oven, air conditioner or the like.

In accordance with principles of the invention, it is further contemplated that the control center may, if desired, alternatively control in real time the peak power demand of the kitchen appliances, for example, in accordance with the relative priorities thereof. Of course, each base station may control the peak power demand, if desired. That is, the control center controls the amount of power utilized by the kitchen appliances within each cell or cells by controlling when various heating (or cooling) means of the kitchen appliances are turned "on." This is especially important inasmuch as one of the key parameters in determining electrical rates charged by a utility company is determined by the peak power load within a specific period of time. Normally, the utility company charges a customer a higher rate to deliver a higher peak power.

Advantageously, a minimum peak power can be achieved by limiting the number of kitchen appliances that are turned on at any one time. Moreover, the kitchen appliances can be prioritized so that desired appliances can be serviced first with respect to energy management, depending on the nature of the appliance and its relative priority or importance to the user.

Included in the diagnostic information periodically transmitted to control center 170 may be the actual power demand of the kitchen appliances. During normal operation, control center 170 determines the limit for the maximum power demand within each cell or desired number of cells. Preferably, the maximum power demand for each cell is user programmable and is stored, for example, in database 190. The actual power demand is dependent on the type and number of the kitchen appliances in each cell or cells. If the actual power demand exceeds the maximum power demand limit, control center 170 may reduce the duty cycle of at least one of the kitchen appliance as discussed in more detail herein below. That is, the "OFF" period of the duty cycle of one or more appliances is lengthen. It should be understood that the duty cycle herein refers to the amount of time the electrical load, e.g., the heating or cooling element, within the kitchen appliance is powered "ON" and "OFF."

In other words, the system determines whether the maximum demand will be exceeded by comparing the calculated load to the maximum system load value. The maximum system load value is user programmable. The calculated load is determined by factoring the power requirements of the appliances currently operating within the cell or cells. It is contemplated that the user has the capability to change the system configuration, by entering the power requirements of each appliance, the priority of the appliance and other parameters such as the control algorithm used in regulating the temperature.

Preferably, each kitchen appliance is preprogrammed with a minimum power On/Off duty cycle to ensure that the appliances operate acceptably. For example, during idle, the duty cycle may be varied greatly. Also, for those appliances having mechanical relays which deteriorate when exercised frequently, it is desirable to limit the frequency that the relays are closed or opened. This is achieved by preprogramming and following minimum On/Off times. For example, the minimum "ON" time might be 4 seconds and the minimum "OFF" time might be 2 seconds.

When control center 170 determines that the maximum demand in a cell or desired number of cells will be exceeded, selected kitchen appliances with the lowest priority and powered "on" for the minimum time are placed into a power cycle "off" state by control center 170. Inasmuch as controller 140 and thus control center 170 knows whether the appliance is in an idle or cook mode, the appliance can judiciously be turned off without affecting the operation of the appliance. Alternatively, base station 105 may place the appropriate kitchen appliance in the power cycle "off" state and inform control center 170 of its actions. Additionally, other kitchen appliances, which may not be currently operating, may have their "off" time extended by control center 170, which is effected through communication to and from the corresponding microprocessor controller 140. For example, when the maximum demand level is exceeded, lowest priority appliances on for the minimum "ON" time are turned "OFF." Then, low priority appliances will have their "OFF' times lengthen by, for example, one second. After an evaluation delay time, power demand of appliances within the cell or cells are evaluated again and appropriate action taken, including, if necessary, shortening the "OFF" times on a priority basis.

In the above manner, control center 170 preforms a so-called "load leveling" algorithm to bring the power demand level within each cell or cells within a "safety" band". Such a "loading leveling" algorithm may be required when additional kitchen appliances within each cell or cells wish to go online.

It should be understood that the above safety band is a range below the maximum allowed demand which allows the kitchen appliances to operate in a cycled manner, e.g., variable duty cycle or pulsed. When the power demand is below the safety band there is power capability to handle more appliances for operation. When the demand is within the safety band, the appliances within the corresponding cell are said to operating harmoniously. When the power demand is below the safety band the control center adjusts the allowable "OFF" times of the kitchen appliances by shortening the "Off" time of prioritized appliances.

The maximum safety band is programmable and may, for example, be set to 5% of the maximum demand. The result is that all appliances under control within a cell will be controlled without interruption up to the maximum demand level. When the maximum demand level is exceeded, the power cycling of the lowest priority operating kitchen appliance is modified by reducing the duty cycle. The portion of the maximum cell load allocated to each appliance is programmed into the control center. Allocation of the maximum cell load is performed by determining the total maximum cell load requirement and the desired maximum cell load. Such information may then be used to calculate the percentage of load each appliances contributes to the total power load. For example, a appliance rated at 2 Kw within a cell with 40 Kw of appliances contributes to 5% of the load. With a desired maximum system load of 20 Kw, the appliance uses 1 Kw of the maximum load.

Preferably, the present network accumulates the on/off state of each kitchen appliance at one second intervals or less for a 15 minute time period. This latter data is used to determine the current peak power demand. Those skilled in the art will readily recognize that the appliance priorities vary as to the time of day. For example, fryers would have a lower priority in the breakfast menu time than a lunchtime when they are heavily used. Accordingly, it is contemplated that the appliance priority may be user programed to vary with expected demand.

Another uniqueness of the present SCK network is that company assets may be readily audited without the need of sending auditors into the field. Indeed, the control would not only have a database of the locations of the appliances, but what their statistical failure rates were, which service agency had the parts and inventory for a specific appliance, among other things. Compared with the prior art philosophy of reacting to malfunctions, the present system actively monitors the performance of the appliance, providing not only a quality control function, but minimizing in the long, run repair cost.

It should be emphasized that the above described flow charts are merely examples of the how the system may be programmed in order to effect the tracking and monitoring of activities directed to billing, repair and maintenance. Other application-specific software may readily be realized by those skilled in the art and who have been equipped with the understanding of the operation of the present invention as set forth in the above description.

Accordingly, it should be understood that the embodiment herein is merely illustrative of the principles of the invention. Various modifications may be made by those skilled in the art which will embody the principles of the invention and fall within the spirit and the scope thereof. For example, hardwired, fiber, infrared or microwave communication channels may be used to link the kitchen or cooking appliances to the control center. Furthermore, the some of the repair and accounting services may be distributed or off loaded to the base stations.

I claim:

1. A communication system for integrating accounting, billing and repair services for restaurant appliances located over a geographical area, comprising:

a plurality of base stations through wireless communication transmitting and receiving messages to and from associated restaurant appliances; and control center means coupled through data links to said plurality of base stations for processing in real-time accounting, billing and repairs for said restaurant appliances in response to messages transmitted to and received from said restaurant appliances via said plurality of base stations.

2. The communication system of claim 1 wherein said data links are wireless data links.

3. The communication system of claim 1 wherein said control center means is located in the same physical location as one of said plurality of base stations.

4. The communication system of claim 1 wherein said control center means is located in a different physical location than said plurality of base stations.

5. The communication system of claim 1 wherein each of said restaurant appliance has a microprocessor means for controlling the operation of the corresponding restaurant appliance in accordance with user selected operating parameters.

6. The communication system of claim 5 wherein said microprocessor means for controlling under program control detects and identifies malfunctions of an associated restaurant appliance.

7. The communication system of claim 5 wherein said microprocessor means reduces the power consumption of said restaurant appliances so as to not exceed a predetermined threshold value.

8. The communication system of claim 7 wherein said microprocessor means reduces the power consumption by shortening the off period of the duty cycle of one or more of said restaurant appliances.

9. The communication system of claim 1 further comprising point of sale means for debiting a user's financial account for expenses associated with repair service of said restaurant appliances.

10. The communication system of claim 1 further including a database containing diagnostic software, accounting records, inventory records, maintenance records and power requirements for said restaurant appliances.

11. The communication system of claim 10 wherein said database is resident in said control center.

12. The communication system of claim 1 wherein said control center means includes
   a communication controller responsive to messages received from said base stations, and
   a communication display coupled to said communication controller, said display displaying associated repair and billing information of said restaurant appliances in a graphical manner.

13. The communication system of claim 1 wherein said control center means in response to messages received from said base stations downloads diagnostic software, dispatches a service vehicle or updates accounting and inventory records for said restaurant appliances.

14. The communication system of claim 1 wherein each of said base stations is associated with a radio coverage area or cell, such that restaurant appliances located within the same cell communicate with the same base station.

15. The communication system of claim 1 wherein each of said restaurant appliances includes a RF transmitter and RF receiver.

16. The communication system of claim 1 wherein each of said restaurant appliances transmits periodically diagnostic information to said control center means via said base stations.

17. The communication system of claim 16 wherein said control center means in response to said diagnostic information disables a malfunctioning restaurant appliance.

18. The communication system of claim 16 wherein said control center means in response to said diagnostic information modifies the cooking profile of at a least one food product for a malfunctioning restaurant appliance.

19. The communication system of claim 1 wherein said control center means in response to a user generated request transmits updated diagnostic software specific to a type of restaurant appliance under service.

20. The communication system of claim 1 wherein said control center means includes an integrated system digital network (ISDN) interconnecting said plurality of base stations.

21. The communication system of claim 1 wherein said messages include cooking profiles, billing and accounting information, appliance identification, diagnostic information, maintenance information or power requirements.

22. The communication system of claim 1 wherein each of said plurality of base stations includes means for periodically interrogating said restaurant appliances for determining the operational status of said restaurant appliances.

23. The communication system of claim 1 further comprising
   a hand held terminal coupled to at least one of said restaurant appliances through a communication link, said hand held terminal interrogating said restaurant appliances so as to diagnose abnormal operating conditions.

24. The communication system of claim 23 wherein said hand held terminal includes
   a computer, and
   means for communicating with said restaurant appliances using wireless communication.

25. The communication system of claim 1 wherein said control center means in response to a user generated request prepares and transmits a service invoice.

26. The communication system of claim 1 wherein said control center means in response to a user generated request prepares and transmits an accounting, billing or repair report for a specific restaurant appliance.

27. A communication system for monitoring and tracking the maintenance and repair of kitchen or cooking appliances, comprising:
   a control center having a database containing repair and maintenance data for said kitchen or cooking appliances;
   a plurality of kitchen base stations;
   a communication link interconnecting said plurality of kitchen base stations to said control center, each of said plurality of kitchen base stations including means for transmitting and receiving repair and maintenance data to and from said control center; and
   a communication link interconnecting said kitchen or cooking appliances to said kitchen base stations, said communication links forming a path for said repair and maintenance data to be transmitted to and from said kitchen or cooking appliances, said control center monitoring and tracking the maintenance and repair of said kitchen or cooking appliances from the repair and maintenance data transmitted over said communication links.

28. The communication system of claim 27 wherein said communication link is a radio communication link.

29. The communication system of claim 27 wherein said communication link is a cellular radio communication link.

30. The communication system of claim 27 wherein said database further includes billing and accounting records, and said system further comprising point of sale means communicating with said control center for debiting a user's financial account for expenses associated with maintenance and repair of a specific kitchen appliance.

31. The communication system of claim 27 wherein said database further contains diagnostic software, accounting records, inventory records and maintenance records for said kitchen appliances.

32. The communication system of claim 27 wherein said control center in response to a user generated request prepares and transmits an accounting, billing or repair report for a specific kitchen appliance.

33. The communication system of claim 27 wherein said control center in response to data received from said kitchen base stations downloads diagnostic software, dispatches a service vehicle or updates accounting and inventory records for said kitchen appliances.

34. The communication system of claim 27 wherein each of said kitchen base stations is associated with a radio coverage area or cell, such that kitchen appliances located within the same cell communicate with the same kitchen base station.

35. The communication system of claim 27 wherein said control center is located in the same physical location as one of said plurality of kitchen base stations.

36. The communication system of claim 27 wherein said control center is located in a different physical location than said plurality of kitchen base stations.

37. The communication system of claim 27 wherein each of said kitchen appliances includes a RF transmitter and RF receiver.

38. The communication system of claim 27 wherein each of said kitchen appliances transmits periodically diagnostic information to said control center via said kitchen base stations.

39. The communication system of claim 38 wherein said control center in response to said diagnostic information disables a malfunctioning kitchen appliance.

40. The communication system of claim 38 wherein said control center in response to said diagnostic information modifies the cooking profile of at a least one food product for a malfunctioning kitchen appliance.

41. The communication system of claim 27 wherein said control center in response to a user generated request transmits updated diagnostic software specific to a type of kitchen appliance under service.

42. The communication system of claim 27 wherein each of said kitchen appliances has a microprocessor based controller, said controller under program control detecting and identifying malfunctions of an associated kitchen appliance.

43. The communication system of claim 27 wherein each of said kitchen appliances has a microprocessor based controller, said controller regulating the power usage of the corresponding kitchen appliance.

44. The communication system of claim 27 wherein said control center includes an integrated system digital network (ISDN) interconnecting said plurality of kitchen base stations.

45. The communication system of claim 27 wherein said control center includes
   a communication controller responsive to data received from said kitchen base stations and said kitchen appliances, and
   a communication display coupled to said communication controller, said communication display displaying said maintenance and repair data in a graphical manner.

46. The communication system of claim 27 wherein said repair and maintenance data includes cooking profiles, billing and accounting information, appliance identification, diagnostic information or maintenance information.

47. The communication system of claim 27 wherein each of said plurality of kitchen base stations includes means for periodically interrogating said kitchen appliances for determining the operational status of said kitchen appliances.

48. The communication system of claim 27 further comprising
   a hand held terminal coupled to at least one of said kitchen appliances through a communication link, said hand held terminal under program control interrogating a specific kitchen appliance so as to diagnose abnormal operating conditions.

49. The communication system of claim 48 wherein said hand held terminal includes
   a computer, and
   means for communicating with said kitchen appliances using wireless communication.

50. The communication system of claim 27 wherein said control center in response to a user generated request prepares and transmits a service invoice.

51. A communication system for processing billing, accounting and diagnostic information for cooking appliances, comprising:
   a plurality of base stations, each including means for transmitting and receiving data associated with the operating conditions of said cooking appliances;
   a control center having a database for storing said billing, accounting and diagnostic information;
   a communication link interconnecting said plurality of base stations to said control center, said control center responsive to said data associated with the operating conditions of said cooking appliances so as to initiate repair service upon the occurrence of a predetermined condition; and
   a point of sale system interconnected to said control center for receiving said accounting and billing data from said control center, said point of sale system directing the transfer of funds, associated with the repair service of a specific cooking appliance, from a user's financial institution to an agency's financial account performing the repair service.

52. The communication system of claim 51 wherein said control center is located in the same physical location as one of said plurality of kitchen base stations.

53. The communication system of claim 51 wherein said control center is located in a different physical location than said plurality of kitchen base stations.

54. The communication system of claim 51 wherein said control center in response to a user generated request prepares and transmits an accounting, billing or repair report for a specific kitchen appliance.

55. The communication system of claim 51 wherein said control center in response to data received from said kitchen base stations downloads diagnostic software, dispatches a service vehicle or updates accounting and inventory records for said kitchen appliances.

56. The communication system of claim 51 wherein each kitchen base station is associated with a radio coverage area or cell, such that kitchen appliances located within the same cell communicate with the same base station.

57. The communication system of claim 51 wherein each of said kitchen appliances includes a RF transmitter and RF receiver.

58. The communication system of claim 51 wherein each of said kitchen appliances transmits periodically diagnostic information to said control center via said base stations.

59. The communication system of claim 58 wherein said control center in response to said diagnostic information from kitchen appliances disables a malfunctioning kitchen appliance.

60. The communication system of claim 58 wherein said control center in response to said diagnostic information modifies the cooking profile of at a least one food product for a malfunctioning kitchen appliance.

61. The communication system of claim 51 wherein said control center in response to a user generated request transmits updated diagnostic software specific to a type of kitchen appliance under service.

62. The communication system of claim 51 wherein each of said kitchen appliances has a microprocessor based controller interfaced therewith so as to detect and identify malfunctions.

63. The communication system of claim 62 wherein said controller controls the power consumption of the kitchen appliance by adjusting the On/Off duty cycle of the kitchen appliance.

64. The communication system of claim 51 wherein said control center includes an integrated system digital network (ISDN) interconnecting said plurality of kitchen base stations.

65. The communication system of claim 51 further including means for displaying said data associated with the operating conditions of said cooking appliances in a graphical manner.

66. The communication system of claim 51 wherein said data associated with the operating conditions of said cooking appliances includes cooking profiles, billing and accounting information, appliance identification, diagnostic information or maintenance information.

67. The communication system of claim 51 wherein each of said plurality of base stations includes means for periodically interrogating said kitchen appliances for determining the operational status of said kitchen appliances.

68. The communication system of claim 51 further comprising means coupled to at least one of said kitchen appliances through a communication link for interrogating a specific kitchen appliance so as to diagnose abnormal operating conditions.

69. The communication system of claim 68 wherein said means for interrogating includes a computer, and wireless means for communicating with said kitchen appliances.

70. The communication system of claim 51 wherein said control center in response to a user generated request prepares and transmits a service invoice.

71. A method of processing billing, accounting and diagnostic information for cooking appliances wherein a plurality of kitchen base stations each transmits and receives data associated with the operating conditions of said cooking appliances over cellular data links, wherein said kitchen base stations interconnect to a control center and a point of sale system, comprising the steps of:

initiating repair service of a specific cooking appliance upon the occurrence of a predetermined condition;

retrieving from said control center accounting and billing information associated with said specific cooking appliance so as to thereby generate a repair invoice;

retrieving billing information from said control center for said specific cooking appliance; and transmitting said billing information to said point of sale of system, said point of sale system electronically transferring funds for the repair of said specific cooking appliance from a user's financial account to an agency's financial account performing the repair.

72. The method of claim 71 further comprising the step of said control center preparing and transmitting an accounting, billing or repair report for said specific cooking appliance.

73. The method of claim 71 further comprising the step of said base stations preparing an accounting, billing or repair report for an associated cooking appliance.

74. The method of claim 71 further comprising step of said control center in response to data received from said kitchen base stations downloading diagnostic software, dispatching a service vehicle or updating accounting and inventory records for said specific kitchen appliance.

75. The method of claim 71 further comprising the step of said specific kitchen appliance transmitting periodically diagnostic information to said control center via said kitchen base stations.

76. The method of claim 71 further comprising the step of said control center in response to diagnostic information disabling a specific kitchen appliance.

77. The method of claim 71 further comprising the step of said control center in response to diagnostic information modifying the cooking profile of a specific kitchen appliance.

78. The method of claim 71 further comprising the step of said control center transmitting updated diagnostic software to said base stations.

79. The method of claim 71 further comprising displaying data associated with the operating conditions of said kitchen appliances in a graphical manner.

80. The method of claim 71 wherein said data associated with the operating conditions of said kitchen appliance includes cooking profiles, billing and accounting information, appliance identification, diagnostic information or maintenance information.

81. The method of claim 71 further comprising the step of periodically interrogating said kitchen appliances for determining the operational status of said kitchen appliances.

82. The method of claim 71 further comprising the step of said control center preparing and transmitting a repair invoice to said base stations.

83. The method of claim 71 further comprising the steps of determining whether the actual power demand of the kitchen appliances will exceed a predetermined threshold value, and reducing the power usage of least one of the kitchen appliance if the actual power demand will exceed a predetermined threshold value.

84. The method of claim 71 wherein the step of reducing the power usage includes the step of shortening the duty cycles of selected cooking appliances.

85. The method of claim 84 wherein the step of reducing the power usage includes the step of turning off selected cooking appliances.

86. The method of claim 71 further comprising the step of prioritizing the kitchen appliances and shortening the on period of one or more lowest prioritized kitchen appliance so as to lower the power usage.

* * * * *